United States Patent
Shinoda

(10) Patent No.: US 8,789,357 B2
(45) Date of Patent: Jul. 29, 2014

(54) CATALYST DETERIORATION DETECTION APPARATUS AND METHOD

(75) Inventor: Yoshihisa Shinoda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/496,049

(22) PCT Filed: Sep. 1, 2010

(86) PCT No.: PCT/JP2010/064915
§ 371 (c)(1),
(2), (4) Date: Mar. 14, 2012

(87) PCT Pub. No.: WO2012/029141
PCT Pub. Date: Mar. 8, 2012

(65) Prior Publication Data
US 2013/0186066 A1    Jul. 25, 2013

(51) Int. Cl.
*F01N 11/00*    (2006.01)

(52) U.S. Cl.
USPC .................. 60/277; 60/274; 60/276; 60/285; 60/286; 60/299

(58) Field of Classification Search
USPC ........... 60/274, 276, 277, 285, 286, 295, 299; 123/304, 27 GE, 431, 525, 526, 575, 123/576; 701/104, 114
See application file for complete search history.

(56) References Cited

U.S. PATENT DOCUMENTS

| | | | |
|---|---|---|---|
| 6,092,369 A * | 7/2000 | Hosogai et al. | 60/277 |
| 7,198,952 B2 * | 4/2007 | Uchida et al. | 436/37 |
| 7,546,834 B1 * | 6/2009 | Ulrey et al. | 123/525 |
| 7,703,435 B2 * | 4/2010 | Surnilla et al. | 123/304 |
| 2002/0134362 A1 * | 9/2002 | Deutsch | 123/575 |
| 2005/0115227 A1 * | 6/2005 | Surnilla et al. | 60/295 |

(Continued)

FOREIGN PATENT DOCUMENTS

| | | |
|---|---|---|
| JP | A-11-159375 | 6/1999 |
| JP | A-2002-130018 | 5/2002 |
| JP | A-2004-239132 | 8/2004 |
| JP | A-2005-240657 | 9/2005 |

OTHER PUBLICATIONS

Japan Institute of Invention and Innovation, *Journal of Technical Disclosure*, Journal No. 2010-503484, Jul. 1, 2010 (with English Abstract).

(Continued)

*Primary Examiner* — Thomas Denion
*Assistant Examiner* — Jorge Leon, Jr.
(74) *Attorney, Agent, or Firm* — Oliff PLC

(57) ABSTRACT

A technique which accurately detects the deterioration of an exhaust gas purification catalyst which is applied to an internal combustion engine capable of using gas fuel and liquid fuel. Where only the gas fuel is used which is difficult to cause the oxygen occluded in the exhaust gas purification catalyst to be released therefrom even if the air fuel ratio of exhaust gas discharged from the internal combustion engine is changed to a rich side, a catalyst deterioration determination part determines whether the exhaust gas purification catalyst has deteriorated, based on either one of a change in an output of an oxygen concentration detection part only at a lean side, and changes in the output of the oxygen concentration detection part at the rich side and at the lean side.

6 Claims, 8 Drawing Sheets

(56) References Cited

U.S. PATENT DOCUMENTS

| | | | |
|---|---|---|---|
| 2008/0173008 A1* | 7/2008 | Kidokoro et al. | 60/277 |
| 2008/0302087 A1* | 12/2008 | Genslak et al. | 60/277 |
| 2009/0248279 A1* | 10/2009 | Ito et al. | 701/109 |
| 2010/0170470 A1* | 7/2010 | Pursifull et al. | 123/299 |
| 2010/0206249 A1* | 8/2010 | Bromberg et al. | 123/3 |
| 2011/0114058 A1* | 5/2011 | Cohn et al. | 123/25 A |

OTHER PUBLICATIONS

Nov. 30, 2010 International Search Report issued in International Patent Application No. PCT/JP2010/064915 (with translation).

* cited by examiner

CATALYST DETERIORATION DETECTION APPARATUS AND METHOD

TECHNICAL FIELD

The present invention relates to a catalyst deterioration detection apparatus and a catalyst deterioration detection method.

BACKGROUND ART

In cases where deterioration detection of a catalyst, which is arranged in an exhaust passage of an internal combustion engine using natural gas as fuel, is carried out by the use of the oxygen storage capacity (OSC) of the catalyst, an $O_2$ sensor for detecting the concentration of oxygen flowing out of the catalyst may take an incorrect value due to the reaction of unborn methane. Accordingly, there has been disclosed a technique of carrying out the detection of catalyst deterioration by changing a determination reference value for catalyst deterioration (for example, see a first patent document). Thus, in the first patent document, the detection of catalyst deterioration is intended to be carried out in an accurate manner.

PRIOR ART DOCUMENTS

Patent Documents

Patent Document 1: Japanese patent application laid-open No. H11-159375

SUMMARY OF THE INVENTION

Problem to be Solved by the Invention

In cases where the detection of deterioration of a catalyst is carried out by the use of the oxygen storage capacity of the catalyst, the air fuel ratio of an exhaust gas discharged from an internal combustion engine is changed to a rich side to cause oxygen to be released from the catalyst, or is changed to a lean side to cause oxygen to be occluded into the catalyst, so that the oxygen concentration downstream of the catalyst at this time is detected. Here, in cases where natural gas is used as fuel, a catalyst stoichiometric point is at the rich side, and the combustion limits at the rich side are narrow, so it has been unable to change the air fuel ratio of the exhaust gas to the rich side to a large extent. In addition, natural gas includes methane of 90% or more in fuel, and methane has low capability of causing oxygen to be released from the catalyst, so it has not been able to raise the oxygen concentration downstream of the catalyst in accordance with the air fuel ratio of the exhaust gas having been changed to the rich side. For that reason, in cases where natural gas is used as fuel, the deterioration of the catalyst has not been able to be detected in an accurate manner.

The present invention has been made in view of the above-mentioned circumstances, and the object of the present invention is to provide a technique which accurately detects the deterioration of an exhaust gas purification catalyst which is applied to an internal combustion engine capable of using gas fuel and liquid fuel.

Means for Solving the Problem

The present invention adopts the following construction.
That is, the present invention resides in a catalyst deterioration detection apparatus which is provided with:
an exhaust gas purification catalyst that is arranged in an exhaust passage of an internal combustion engine capable of using gas fuel and liquid fuel;
an oxygen concentration detection part that is arranged in said exhaust passage at a downstream side of said exhaust gas purification catalyst; and
a catalyst deterioration determination part that causes the air fuel ratio of an exhaust gas discharged from said internal combustion engine to change to a rich side and a lean side, makes a comparison between a change of the air fuel ratio and a change of an output of said oxygen concentration detection part, and determines whether said exhaust gas purification catalyst has deteriorated;
wherein in cases where only the gas fuel is used which is difficult to cause the oxygen occluded in said exhaust gas purification catalyst to be released therefrom even if the air fuel ratio of the exhaust gas discharged from said internal combustion engine is changed to the rich side, said catalyst deterioration determination part determines whether said exhaust gas purification catalyst has deteriorated, based on either one of a change in the output of said oxygen concentration detection part only at the lean side, and changes in the output of said oxygen concentration detection part at the rich side and at the lean side.

According to the present invention, when it is determined, on the one hand, whether the exhaust gas purification catalyst has deteriorated, based on the change only at the lean side in the output of the oxygen concentration detection part, it may not be able to cause the air fuel ratio of the exhaust gas to change to the rich side to a large extent, and it is able to cause the oxygen concentration downstream of the catalyst to fall in accordance with the air fuel ratio of the exhaust gas having been caused to change to the lean side. When it is determined, on the other hand, whether the exhaust gas purification catalyst has deteriorated, based on the changes at the rich side and at the lean side in the output of the oxygen concentration detection part, the output of the oxygen concentration detection part at the time of causing the air fuel ratio of the exhaust gas to change to the rich side can also be taken into consideration. According to this, the deterioration of the exhaust gas purification catalyst can be detected in an accurate manner.

When said catalyst deterioration determination part determines whether said exhaust gas purification catalyst has deteriorated, based on the changes at the rich side and at the lean side in the output of said oxygen concentration detection part, the liquid fuel may preferably be supplied.

The liquid fuel, for which a catalyst stoichiometric point is not at the rich side and the combustion limits at the rich side are not narrow, is able to change the air fuel ratio of the exhaust gas to the rich side to a large extent. In addition, unlike the gas fuel which is difficult to cause the oxygen occluded in the exhaust gas purification catalyst to be released therefrom even if the air fuel ratio of exhaust gas discharged from the internal combustion engine is changed to the rich side, the liquid fuel is able to cause the oxygen concentration downstream of the catalyst to rise in accordance with the air fuel ratio of the exhaust gas having been caused to change to the rich side. According to this, even by means of the output of the oxygen concentration detection part at the time of causing the air fuel ratio of the exhaust gas to change to the rich side, too, it is possible to detect the deterioration of the exhaust gas purification catalyst in an accurate manner.

In cases where the liquid fuel to be supplied includes an oxygenated fuel, the higher the concentration of said oxygenated fuel, the more the proportion of the liquid fuel to be supplied may preferably be decreased.

The higher the concentration of the oxygenated fuel, the easier it becomes to cause the oxygen occluded in the exhaust gas purification catalyst to be released therefrom at the time when the air fuel ratio of the exhaust gas discharged from the internal combustion engine is changed to the rich side. As a result, the higher the concentration of the oxygenated fuel, the more it becomes possible to cause the oxygen occluded in the exhaust gas purification catalyst to be released therefrom even if the proportion of the liquid fuel to be supplied is decreased.

The higher the temperature of said exhaust gas purification catalyst, the more the proportion of the liquid fuel to be supplied may preferably be decreased.

The higher the temperature of the exhaust gas purification catalyst, the easier it becomes to cause the oxygen occluded in the exhaust gas purification catalyst to be released therefrom at the time when the air fuel ratio of the exhaust gas discharged from the internal combustion engine is caused to change to the rich side. As a result, the higher the temperature of the exhaust gas purification catalyst, the more it becomes possible to cause the oxygen occluded in the exhaust gas purification catalyst to be released therefrom even if the proportion of the liquid fuel to be supplied is decreased.

Said catalyst deterioration determination part may preferably cause a center point at the time when the air fuel ratio of the exhaust gas discharged from said internal combustion engine is caused to change to the rich side and to the lean side to shift to the lean side.

As a result of this, the catalyst stoichiometric point of the gas fuel is at the rich side, and hence the combustion limits at the rich side are narrow, but the center point is shifted to the lean side, so it is possible to cause the air fuel ratio of the exhaust gas discharged from the internal combustion engine to change to the rich side and to the lean side.

In the present invention, the following construction is adopted. That is, the present invention resides in a catalyst deterioration detection for an exhaust gas purification catalyst that is arranged in an exhaust passage of an internal combustion engine capable of using gas fuel and liquid fuel comprising steps of;

an oxygen concentration detection step of detecting the oxygen concentration in said exhaust passage at a downstream side of said exhaust gas purification catalyst; and a catalyst deterioration determination step of causing the air fuel ratio of an exhaust gas discharged from said internal combustion engine to change to a rich side and a lean side, making a comparison between a change of the air fuel ratio and a change of oxygen concentration detected by said oxygen concentration detection step, and determining whether said exhaust gas purification catalyst has deteriorated;

wherein in cases where said internal combustion engine is operated by using only the gas fuel which is difficult to cause the oxygen occluded in said exhaust gas purification catalyst to be released therefrom even if the air fuel ratio of the exhaust gas discharged from said internal combustion engine is changed to the rich side, said catalyst deterioration determination step determines whether said exhaust gas purification catalyst has deteriorated, based on either one of a change in the oxygen concentration detected by said oxygen concentration detection step only at the lean side, and changes in the oxygen concentration detected by said oxygen concentration detection step at the rich side and at the lean side.

According to this aspect of the present invention, too, the deterioration of the exhaust gas purification catalyst can be detected in an accurate manner.

Advantageous Effect of the Invention

According to the present invention, it is possible to accurately detect the deterioration of an exhaust gas purification catalyst which is applied to an internal combustion engine capable of using gas fuel and liquid fuel.

EMBODIMENTS FOR CARRYING OUT THE INVENTION

Hereinafter, a specific embodiment of the present invention will be described.

First Embodiment

Figure 1:
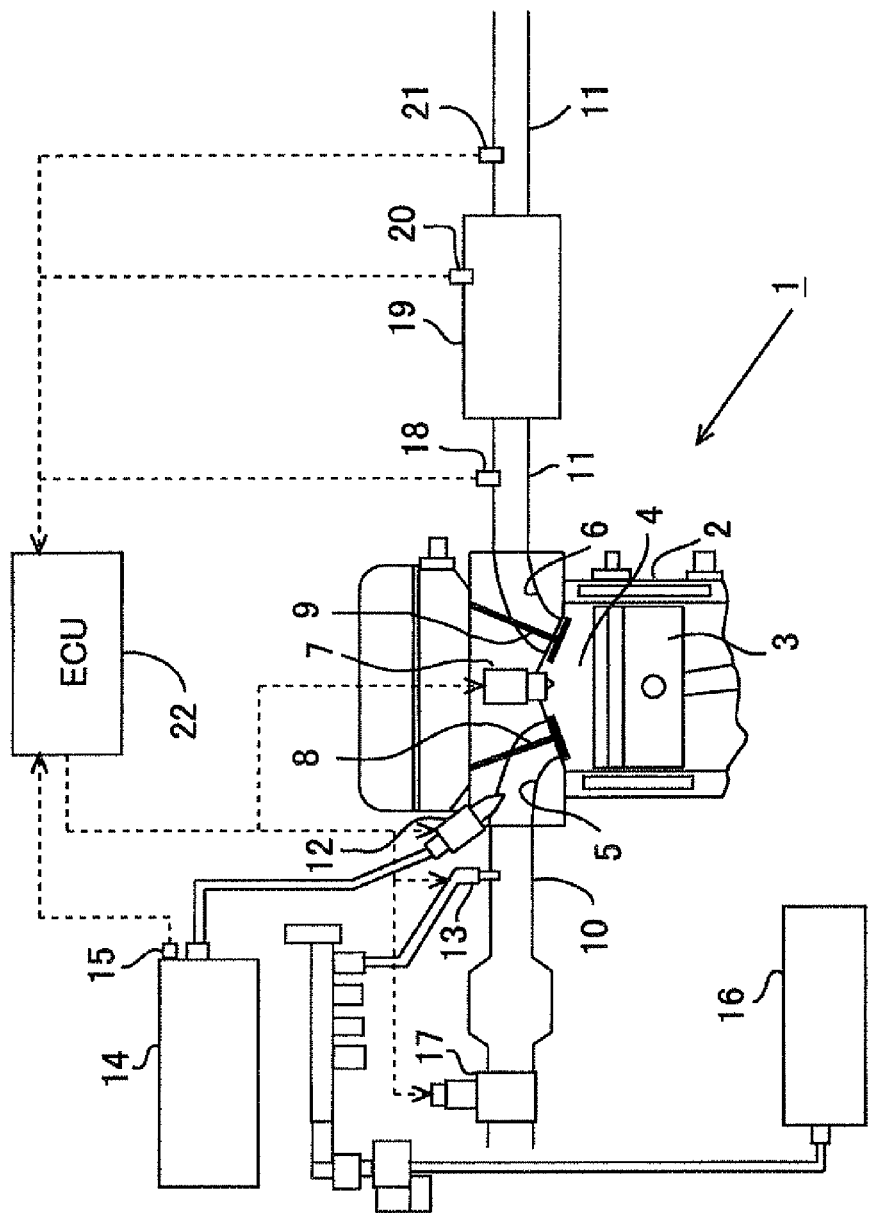
FIG. 1 IS A VIEW SHOWING THE SCHEMATIC CONSTRUCTION OF AN INTERNAL COMBUSTION ENGINE ACCORDING TO A FIRST EMBODIMENT OF THE PRESENT INVENTION.

FIG. 1 is a view showing the schematic construction of an internal combustion engine according to a first embodiment of the present invention. As fuel for the internal combustion engine 1 shown in FIG. 1, there can be used liquid fuel such as a petroleum-based liquid fuel like gasoline, a mixed liquid fuel in which oxygenated fuel such as alcohol like ethanol, methanol, etc., or MTBE, is mixed with a petroleum-based liquid fuel such as gasoline. In addition, as fuel for the internal combustion engine 1, there can also be used gas fuel such as compressed natural gas (CNG). In this embodiment, the case where a liquid fuel having oxygenated fuel mixed with gasoline, and CNG as gas fuel, are used is mentioned as an example.

A piston 3 is arranged inside a cylinder 2 of the internal combustion engine 1 for sliding movement relative thereto. In an upper portion inside the cylinder 2, there is defined a combustion chamber 4 by means of an upper wall and an inner wall of the cylinder 2 and a top surface of the piston 3. An intake port 5 and an exhaust port 6 are connected to the upper portion of the combustion chamber 4. A spark plug 7 for igniting an air fuel mixture inside the cylinder 2 is arranged in the upper portion of the cylinder 2. An opening portion of the intake port 5 to the combustion chamber 4 is opened and closed by an intake valve 8. Also, an opening portion of the exhaust port 6 to the combustion chamber 4 is opened and closed by an exhaust valve 9. The intake port 5 is connected at its upstream side to an intake pipe 10. The exhaust port 6 is connected at its downstream side to an exhaust pipe 11. The intake port 5 and the intake pipe 10 in this embodiment correspond to an intake passage. The exhaust port 6 and the exhaust pipe 11 in this embodiment correspond to an exhaust passage of the present invention.

In the intake port 5, a first fuel injection valve 12 is arranged which serves to inject the liquid fuel to intake air flowing through the intake port 5. In the intake pipe 10, a second fuel injection valve 13 is arranged which serves to inject the CNG to intake air flowing through the intake pipe 10. The fuels injected from the first fuel injection valve 12 and the second fuel injection valve 13 are mixed with the intake air to form an air fuel mixture. The liquid fuel stored in a first fuel tank 14 is supplied to the first fuel injection valve 12. In the first fuel tank 14, an oxygenated fuel concentration sensor 15 is arranged which serves to detect the concentration of the oxygenated fuel in the liquid fuel. The CNG stored in the second fuel tank 16 is supplied to the second fuel injection valve 13. A throttle valve 17 is arranged in the intake pipe 10 at a location upstream of the second fuel injection valve 13. The amount of intake air flowing through the intake pipe 10 can be adjusted by the throttle valve 17.

In the exhaust pipe 11, an air fuel ratio sensor 18 is arranged which serves to detect the air fuel ratio of exhaust gas discharged from the internal combustion engine 1. In the exhaust pipe 11 downstream of the air fuel ratio sensor 18, an exhaust gas purification catalyst 19 is arranged which serves to purify the exhaust gas discharged from the internal combustion engine 1. The exhaust gas purification catalyst 19 has a function in which oxygen is released therefrom when the air fuel ratio of the exhaust gas flowing into the exhaust gas purification catalyst 19 is rich, and oxygen is occluded when the air fuel ratio of the exhaust gas is lean. As the exhaust gas purification catalyst 19, there is, for example, a three-way catalyst, etc. In the exhaust gas purification catalyst 19, a catalyst temperature sensor 20 is arranged which serves to detect the temperature of the exhaust gas purification catalyst 19. In the exhaust pipe 11 downstream of the exhaust gas purification catalyst 19, an $O_2$ sensor 21 is arranged which serves to detect the oxygen concentration of the exhaust gas flowing out from the exhaust gas purification catalyst 19. Here, note that the present invention is not limited to the $O_2$ sensor 21, but an air fuel ratio sensor or the like may be used instead of the $O_2$ sensor 21 if it is able to detect the oxygen concentration of the exhaust gas. The $O_2$ sensor 21 corresponds to an oxygen concentration detection part of the present invention.

In the internal combustion engine 1, there is arranged in combination therewith an ECU (Electronic Control Unit) 22 for controlling the internal combustion engine 1. The ECU 22 is a unit that controls the operating state of the internal combustion engine 1 in accordance with the operating conditions of the internal combustion engine 1 and/or driver's requirements. A variety of kinds of sensors such as the oxygenated fuel concentration sensor 15, the air fuel ratio sensor 18, the catalyst temperature sensor 20, the $O_2$ sensor 21, and so on are connected to the ECU 22 through wiring, and the outputs of these various sensors are inputted to the ECU 22. On the other hand, the spark plug 7, the first fuel injection valve 12, the second fuel injection valve 13, the throttle valve 17 and so on are connected to the ECU 22 through electrical wiring, so that these valves are controlled by means of the ECU 22.

(Catalyst Deterioration Determination Control)

Figure 2:
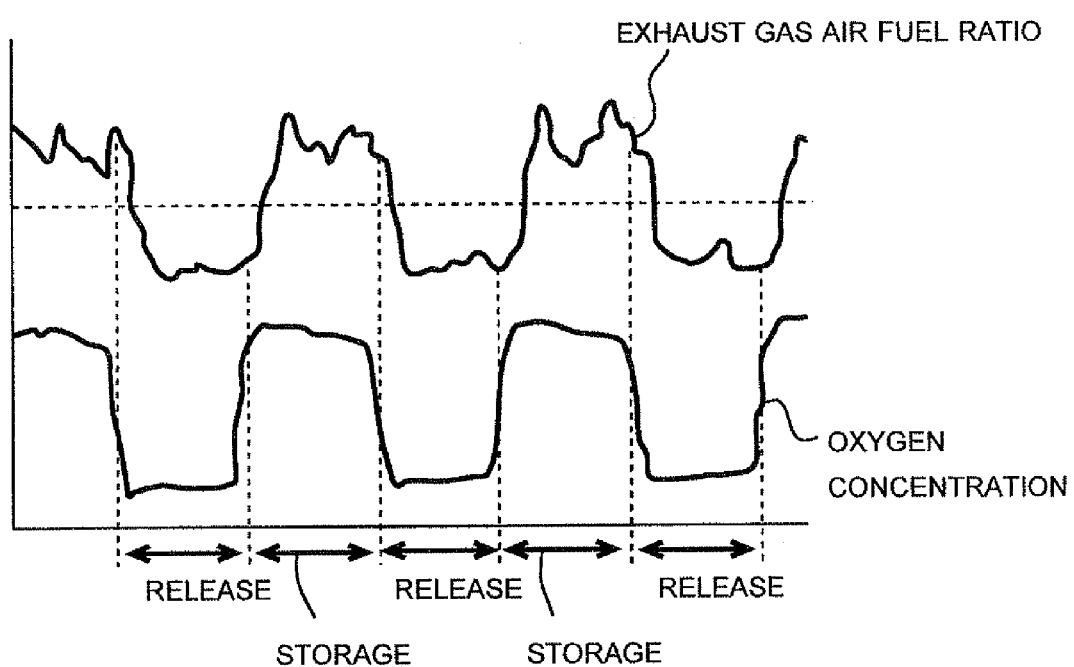
FIG. 2 IS A VIEW SHOWING A MODEL OF THE AIR FUEL RATIO OF EXHAUST GAS AND ITS RELATED OXYGEN CONCENTRATION ACCORDING TO THE FIRST EMBODIMENT.
Figure 3:
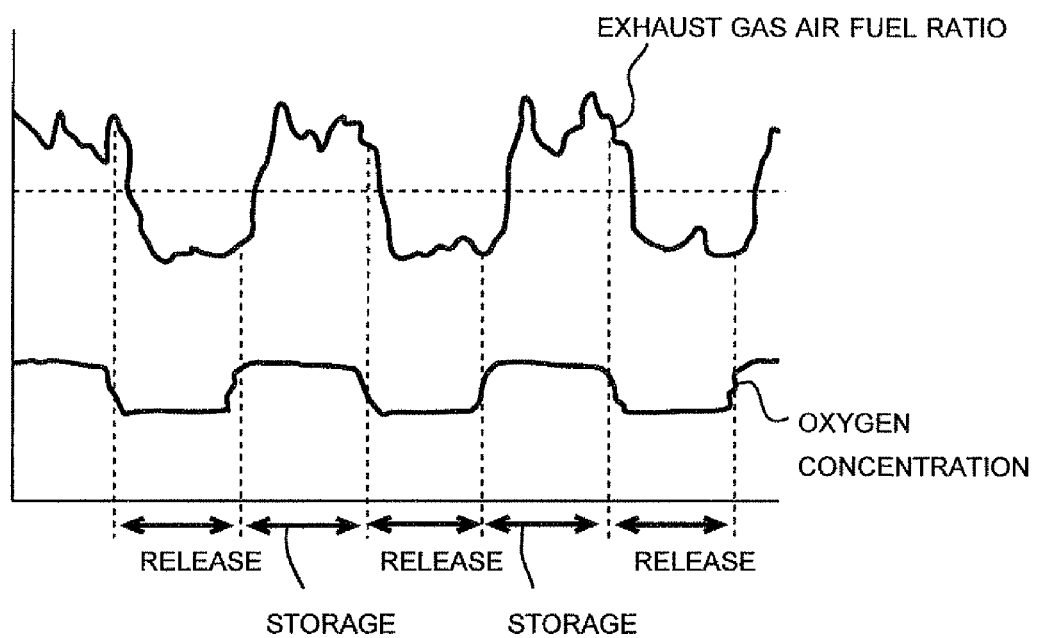
FIG. 3 IS A VIEW SHOWING A MODEL OF THE AIR FUEL RATIO OF EXHAUST GAS AND ITS UNRELATED OXYGEN CONCENTRATION ACCORDING TO THE FIRST EMBODIMENT.
Figure 4:
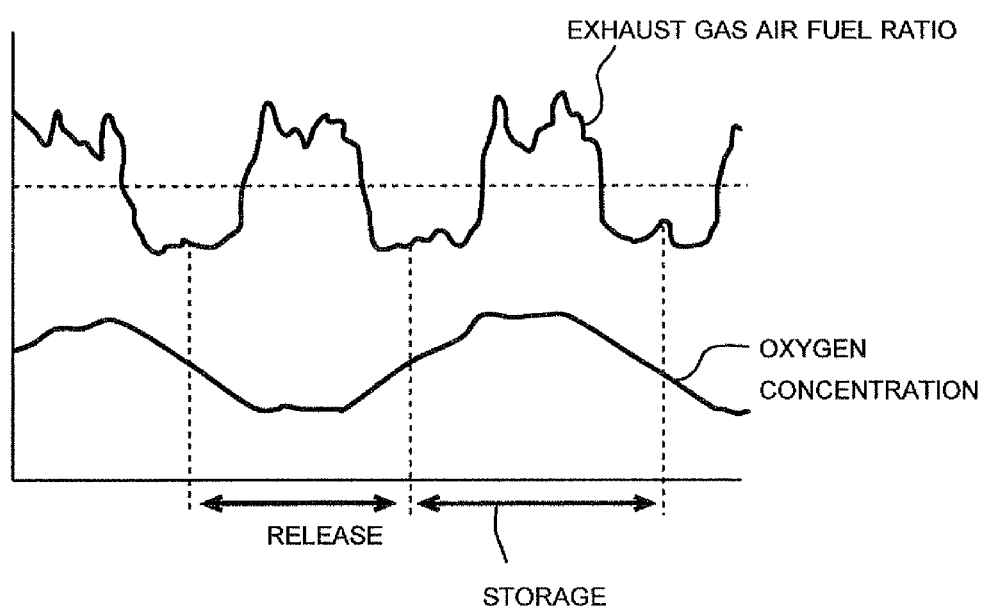
FIG. 4 IS A VIEW SHOWING A MODEL OF THE AIR FUEL RATIO OF EXHAUST GAS AND ITS UNRELATED OXYGEN CONCENTRATION ACCORDING TO THE FIRST EMBODIMENT.

The ECU 22 causes the air fuel ratio of the exhaust gas discharged from the internal combustion engine 1 to change to a rich side and a lean side by the use of the oxygen storage capacity (OSC) of the exhaust gas purification catalyst 19, makes a comparison between a change of the air fuel ratio and a change of an output of the $O_2$ sensor 21, and determines whether the exhaust gas purification catalyst 19 has deteriorated. Specifically, the change of the air fuel ratio is detected by means of the air fuel ratio sensor 18 by causing the air fuel ratio of the exhaust gas discharged from the internal combustion engine 1 to change to the rich side and to the lean side. At this time, in the exhaust gas purification catalyst 19, oxygen is released therefrom when the air fuel ratio of the exhaust gas is at the rich side, and oxygen is occluded thereto when the air fuel ratio of the exhaust gas is at the lean side. If the exhaust gas purification catalyst 19 has not deteriorated, the capacity or capability thereof to release or occlude oxygen is high, so the exhaust gas purification catalyst 19 releases or occludes oxygen in accordance with the change of the air fuel ratio of the exhaust gas. Therefore, as shown in FIG. 2, the oxygen concentration downstream of the exhaust gas purification catalyst 19 changes in accordance with the detected value of the $O_2$ sensor 21. On the other hand, as the exhaust gas purification catalyst 19 deteriorates, the capability of the exhaust gas purification catalyst 19 to release and occlude oxygen becomes lower. Therefore, as shown in FIG. 3, the oxygen concentration downstream of the exhaust gas purification catalyst 19 may not follow the detected value of the $O_2$ sensor 21, thus resulting in that the amount of change thereof changes to a small extent. In addition, as shown in FIG. 4, the oxygen concentration downstream of the exhaust gas purification catalyst 19 may not follow the detected value of the $O_2$ sensor 21, thus resulting in that it changes in a period shifted with respect to that of the air fuel ratio of the exhaust gas. In these cases as shown in FIG. 3 and FIG. 4, a determination can be made that the exhaust gas purification catalyst 19 has deteriorated. In this manner, the deterioration of the exhaust gas purification catalyst 19 can be detected by depending on whether the oxygen concentration downstream of the exhaust gas purification catalyst 19 changes to follow the detected value of the air fuel ratio sensor 18 when the oxygen concentration of the exhaust gas flowing out from the exhaust gas purification catalyst 19 is detected by the $O_2$ sensor 21. This control is called catalyst deterioration determination control, and the ECU 22, which executes this control, corresponds to a catalyst deterioration determination part of the present invention.

In cases where the detection of deterioration of the exhaust gas purification catalyst 19 is carried out by the use of the oxygen adsorption capacity of the exhaust gas purification catalyst 19, as mentioned above, the air fuel ratio of the exhaust gas discharged from the internal combustion engine 1 is changed to the rich side to cause oxygen to be released from the exhaust gas purification catalyst 19, or is changed to the lean side to cause oxygen to be occluded into the exhaust gas purification catalyst 19, so that the oxygen concentration at this time is detected. Here, in cases where CNG is used as fuel, a catalyst stoichiometric point is at the rich side, and the combustion limits at the rich side are narrow, so it has been unable to change the air fuel ratio of the exhaust gas to the rich side to a large extent. In addition, CNG includes methane at a percentage of 90 or more in its fuel, and methane has low capability of causing oxygen to be released from the exhaust gas purification catalyst 19, so it has not been able to cause the oxygen concentration downstream of the exhaust gas purification catalyst 19 to rise in accordance with the air fuel ratio of the exhaust gas having been caused to change to the rich side. For that reason, in cases where only the gas fuel is used which is difficult to cause the air fuel ratio of the exhaust gas discharged from the internal combustion engine 1 to the rich side, and which is more difficult than the liquid fuel to cause the oxygen occluded in the exhaust gas purification catalyst 19 to be released therefrom even if the air fuel ratio of the exhaust gas is changed to the rich side, as in the case of CNG, the deterioration of the exhaust gas purification catalyst 19 has not been able to be detected in an accurate manner according to the catalyst deterioration determination control.

Accordingly, in this embodiment, at the time when the catalyst deterioration determination control is executed, in cases where only the gas fuel is used which is more difficult than the liquid fuel to cause the oxygen occluded in the exhaust gas purification catalyst 19 to be released therefrom even if the air fuel ratio of the exhaust gas discharged from the internal combustion engine 1 is changed to the rich side, as in the case of CNG, it is determined whether the exhaust gas purification catalyst 19 has deteriorated, based on either one of the change only at the lean side in the output of the $O_2$ sensor 21, and the changes at the rich side and at the lean side in the output of the $O_2$ sensor.

According to this embodiment, when it is determined, on the one hand, whether the exhaust gas purification catalyst 19 has deteriorated, based on the change only at the lean side in the output of the $O_2$ sensor 21, it may not be able to cause the air fuel ratio of the exhaust gas to change to the rich side to a large extent, and it is able to cause the oxygen concentration downstream of the exhaust gas purification catalyst 19 to fall in accordance with the air fuel ratio of the exhaust gas having been caused to change to the lean side. When it is determined, on the other hand, whether the exhaust gas purification catalyst 19 has deteriorated, based on the changes both at the rich side and at the lean side in the output of the $O_2$ sensor 21, the output of the $O_2$ sensor 21 at the time of causing the air fuel ratio of the exhaust gas to change to the rich side can also be taken into consideration. According to this, the deterioration of the exhaust gas purification catalyst 19 can be detected in an accurate manner.

In addition, in this embodiment, at the time of carrying out the catalyst deterioration determination control, when it is determined whether the exhaust gas purification catalyst 19 has deteriorated, based on the changes both at the rich side and at the lean side in the output of the $O_2$ sensor 21, the liquid fuel is supplied.

The liquid fuel, for which the catalyst stoichiometric point is not at the rich side and the combustion limits at the rich side are not narrow, is able to change the air fuel ratio of the exhaust gas to the rich side to a large extent. In addition, unlike CNG, the liquid fuel is able to cause the oxygen concentration downstream of the exhaust gas purification catalyst 19 to rise in accordance with the air fuel ratio of the exhaust gas having been caused to change to the rich side. According to this, even by means of the output of the $O_2$ sensor 21 at the time of causing the air fuel ratio of the exhaust gas to change to the rich side, too, it is possible to detect the deterioration of the exhaust gas purification catalyst 19 in an accurate manner.

Also, in this embodiment, in cases where the liquid fuel to be supplied includes an oxygenated fuel, the higher the concentration of the oxygenated fuel detected by the oxygenated fuel concentration sensor 15, the more the proportion of the liquid fuel to be supplied is decreased. For example, in the case of the liquid fuel including alcohol in gasoline as an oxygenated fuel, the higher the alcohol concentration, the more the proportion of the liquid fuel to be supplied at the time of carrying out the catalyst deterioration determination control is decreased.

The higher the concentration of the oxygenated fuel, the easier it becomes to cause the oxygen occluded in the exhaust gas purification catalyst 19 to be released therefrom at the time when the air fuel ratio of the exhaust gas discharged from the internal combustion engine 1 is changed to the rich side. As a result, the higher the concentration of the oxygenated fuel, the more it becomes possible to cause the oxygen occluded in the exhaust gas purification catalyst 19 to be released therefrom even if the proportion of the liquid fuel to be supplied is decreased.

Also, in this embodiment, the higher the temperature of the exhaust gas purification catalyst 19 detected by the catalyst temperature sensor 20, the more the proportion of the liquid fuel to be supplied is decreased.

The higher the temperature of the exhaust gas purification catalyst 19, the easier it becomes to cause the oxygen occluded in the exhaust gas purification catalyst 19 to be released therefrom at the time when the air fuel ratio of the exhaust gas discharged from the internal combustion engine 1 is changed to the rich side. As a result, the higher the temperature of the exhaust gas purification catalyst 19, the more it becomes possible to cause the oxygen occluded in the exhaust gas purification catalyst 19 to be released therefrom even if the proportion of the liquid fuel to be supplied is decreased.

Moreover, in this embodiment, at the time of carrying out the catalyst deterioration determination control, when it is determined whether the exhaust gas purification catalyst 19 has deteriorated, based on the change only at the lean side in the output of the $O_2$ sensor 21, the center point at the time when the air fuel ratio of the exhaust gas discharged from the internal combustion engine 1 is caused to change to the rich side and to the lean side is caused to shift to the lean side.

As a result of this, the catalyst stoichiometric point of the CNG is at the rich side, and hence the combustion limits at the rich side are narrow, but the center point is shifted to the lean side, so it is possible to cause the air fuel ratio of the exhaust gas discharged from the internal combustion engine 1 to change to the rich side and to the lean side. Therefore, the change at the lean side in the output of the $O_2$ sensor 21 can also be made larger and clearer.

Here, note that when it is determined whether the exhaust gas purification catalyst 19 has deteriorated, based on the changes both at the rich side and at the lean side in the output of the $O_2$ sensor 21, too, the center point at the time when the air fuel ratio of the exhaust gas is caused to change to the rich side and to the lean side may be caused to shift to the lean side.

(Catalyst Deterioration Determination Control Routine at the Time of Using CNG)

Figure 5:
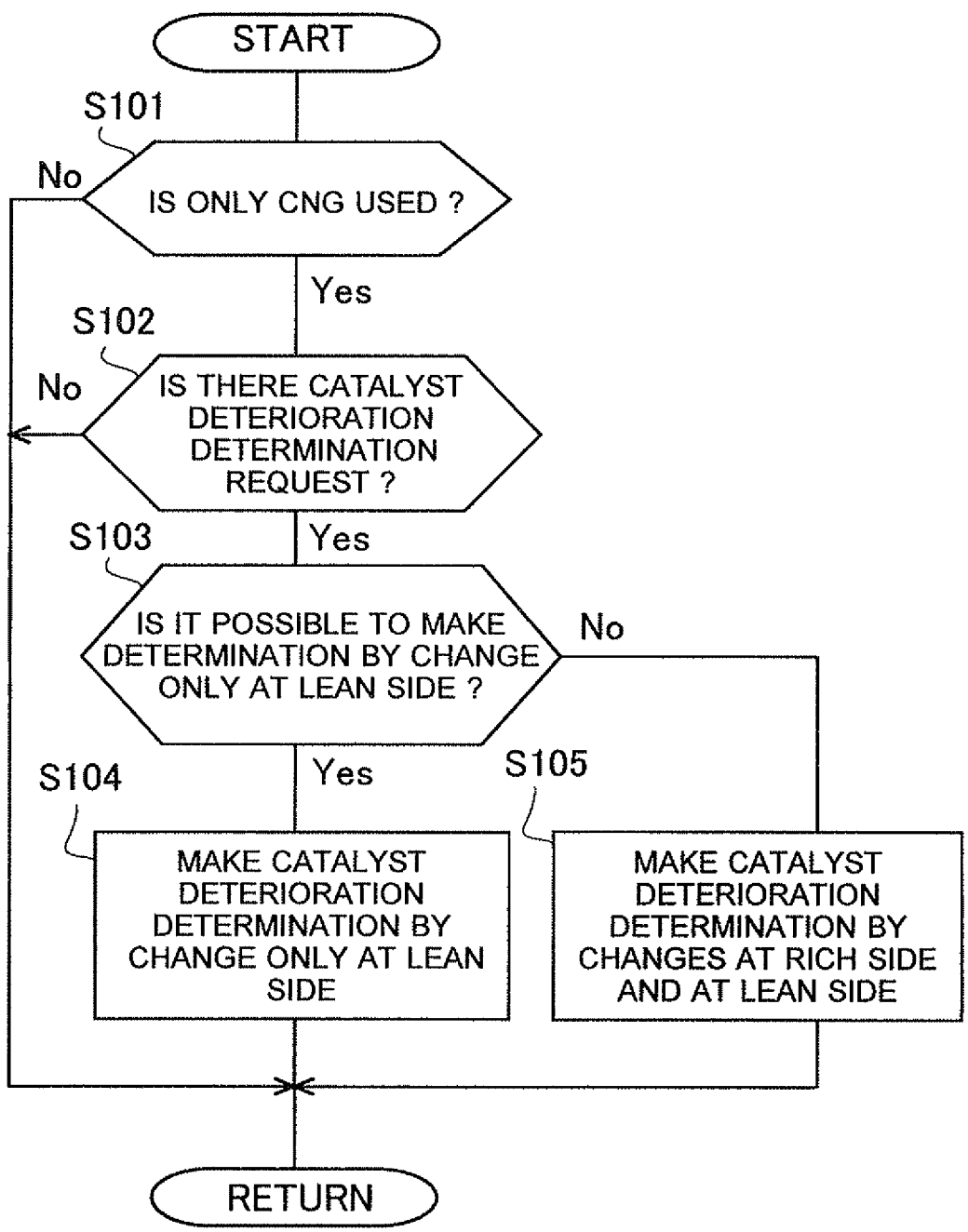
FIG. 5 IS A FLOW CHART SHOWING A CATALYST DETERIORATION DETERMINATION CONTROL ROUTINE AT THE TIME OF USING CNG ACCORDING TO THE FIRST EMBODIMENT.

FIG. 5 is a flow chart showing a catalyst deterioration determination control routine at the time of using CNG in which catalyst deterioration determination control is carried out in the case of using only CNG. The catalyst deterioration determination control routine at the time of using CNG will be explained based on the flow chart shown in FIG. 5. This routine is repeatedly carried out by means of the ECU 22 at each predetermined time interval.

When this routine is carried out, first in step S101, it is determined whether only CNG is used for fuel. In cases where an affirmative determination is made in step S101, the routine advances to step S102. On the other hand, in cases where a negative determination is made in step S101, this routine is once ended.

In S102, in cases where only CNG is used for fuel, it is determined whether there is any request that a catalyst deterioration determination be carried out according to the catalyst deterioration determination control. The time to carry out the catalyst deterioration determination control is set to be an arbitrary time during one continuous operation period of the internal combustion engine. In cases where an affirmative determination is made in step S102, the routine advances to step S103. On the other hand, in cases where a negative determination is made in step S102, this routine is once ended.

In S103, it is determined whether the deterioration of the exhaust gas purification catalyst 19 can be determined, based on the change only at the lean side in the output of the $O_2$ sensor 21. That is, in step S103, a selection is made between whether the deterioration of the exhaust gas purification catalyst 19 is determined based on the change only at the lean side in the output of the $O_2$ sensor 21, and whether the deterioration of the exhaust gas purification catalyst 19 is determined based on the changes both at the rich side and at the lean side in the output of the $O_2$ sensor 21. The case where the deterioration of the exhaust gas purification catalyst 19 can be determined based on the change only at the lean side in the output of the $O_2$ sensor 21 is at the time where the deterioration of the exhaust gas purification catalyst 19 can be determined without taking into consideration even the change at the rich side in the output of the $O_2$ sensor 21. In step S103, the air fuel ratio of the exhaust gas discharged from the internal combustion engine 1 is caused to change to the rich side and to the lean side at one time only, and if the amount of change of the output of the $O_2$ sensor 21 at this time becomes equal to or larger than a predetermined fixed amount, the selection is made such that the deterioration of the exhaust gas purification catalyst 19 is determined based on the change only at the lean side in the output of the $O_2$ sensor 21 (an affirmative determination in S103). On the other hand, the air fuel ratio of the exhaust gas discharged from the internal combustion engine 1 is caused to change to the rich side and to the lean side at one time only, and if the amount of change of the output of the $O_2$ sensor 21 at this time is less than the predetermined fixed amount, the deterioration of the exhaust gas purification catalyst 19 can not be determined based solely on the change only at the lean side in the output of the $O_2$ sensor 21. Therefore, in cases where the amount of change of the output of the $O_2$ sensor 21 is less than the predetermined fixed amount, the selection is made such that the deterioration of the exhaust gas purification catalyst 19 is determined based on the changes both at the rich side and at the lean side in the output of the $O_2$ sensor 21 (a negative determination in S103). In cases where an affirmative determination is made in step S103, the routine advances to step S104. In cases where a negative determination is made in step S103, the routine advances to step S105.

In S104, catalyst deterioration determination control is carried out in which it is determined whether the deterioration of the exhaust gas purification catalyst 19 is determined based on the change only at the lean side in the output of the $O_2$ sensor 21. In the catalyst deterioration determination control in S104, CNG is injected from the second fuel injection valve 13 without causing the liquid fuel to be injected from the first fuel injection valve 12. Then, the center point at the time when the air fuel ratio of the exhaust gas discharged from the internal combustion engine 1 is caused to change to the rich side and to the lean side is caused to shift to the lean side, so that the air fuel ratio of the exhaust gas is caused to change to the rich side to a small extent, and to the lean side to a large extent. After that, the change at the lean side of the air fuel ratio of the exhaust gas is detected by the air fuel ratio sensor 18. Also, the oxygen concentration downstream of the exhaust gas purification catalyst 19 at the time when the air fuel ratio of the exhaust gas has been caused to change to the lean side is detected by the $O_2$ sensor 21. As a result of this, if the output of the $O_2$ sensor 21 indicates that the oxygen concentration downstream of the exhaust gas purification catalyst 19 falls in accordance with the air fuel ratio of the exhaust gas having been caused to change to the lean side, it is determined that the exhaust gas purification catalyst 19 has not deteriorated. On the other hand, if the output of the $O_2$ sensor 21 indicates that the oxygen concentration downstream of the exhaust gas purification catalyst 19 changes not in accordance with the air fuel ratio of the exhaust gas having been caused to change to the lean side, it is determined that the exhaust gas purification catalyst 19 has deteriorated. After the processing of S104, this routine is once ended.

Figure 6:
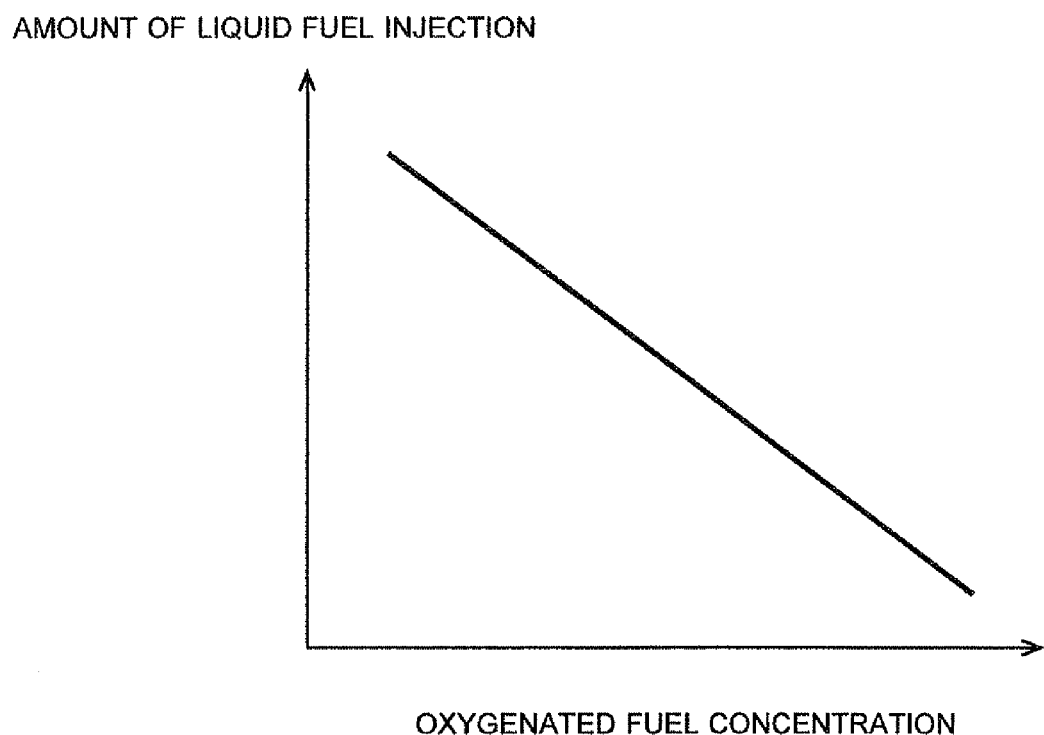
FIG. 6 IS A VIEW SHOWING THE RELATION BETWEEN THE CONCENTRATION OF AN OXYGENATED FUEL AND THE AMOUNT OF LIQUID FUEL INJECTION ACCORDING TO THE FIRST EMBODIMENT.
Figure 7:
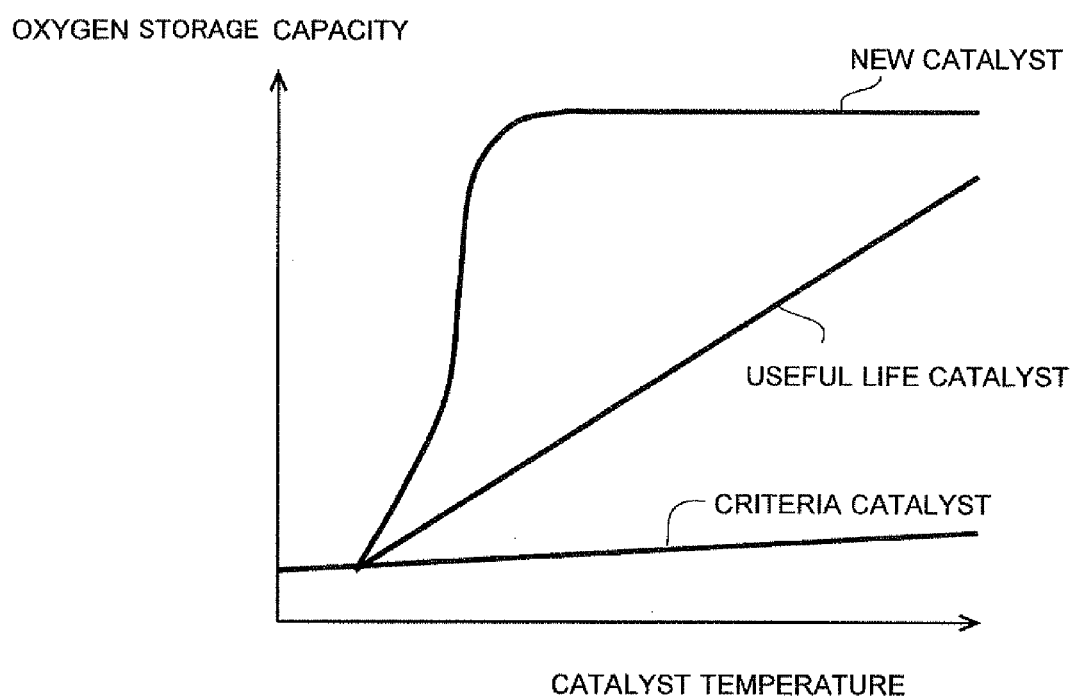
FIG. 7 IS A VIEW SHOWING THE OXYGEN ADSORPTION CAPACITY OF AN EXHAUST GAS PURIFICATION CATALYST IN ACCORDANCE WITH ITS DETERIORATION ACCORDING TO THE FIRST EMBODIMENT.
Figure 8:
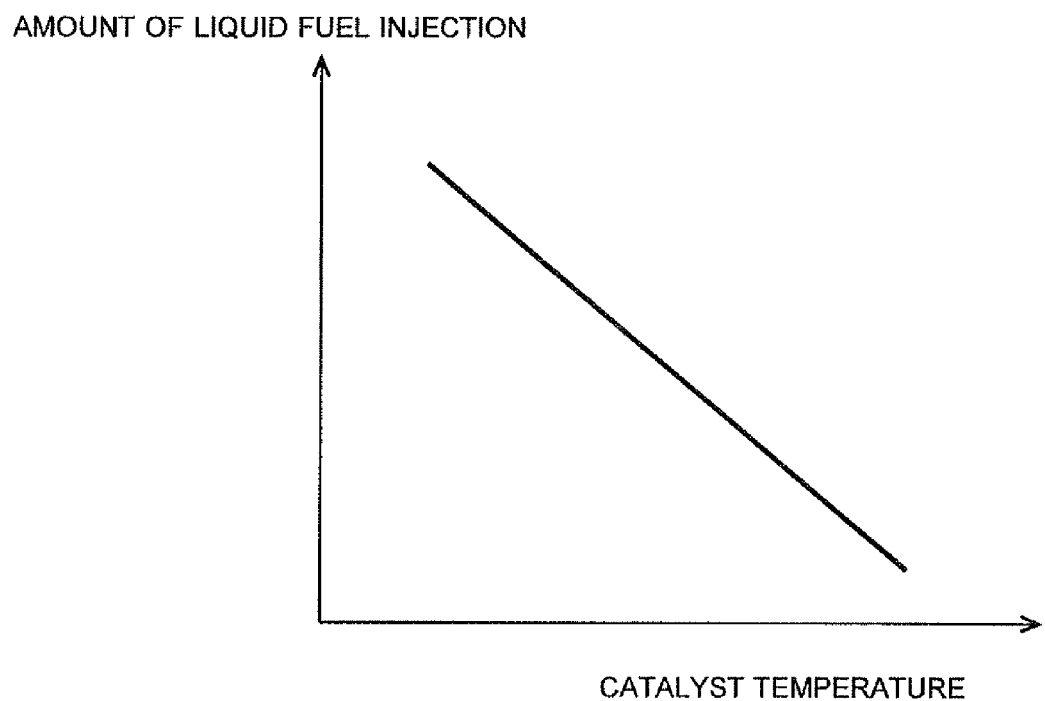
FIG. 8 IS A VIEW SHOWING THE RELATION BETWEEN THE CATALYST TEMPERATURE AND THE AMOUNT OF LIQUID FUEL INJECTION ACCORDING TO THE FIRST EMBODIMENT.

In step S105, catalyst deterioration determination control is carried out in which it is determined whether the deterioration of the exhaust gas purification catalyst 19 is determined based on the changes both at the rich side and at the lean side in the output of the $O_2$ sensor 21. In the catalyst deterioration determination control in S105, the liquid fuel is injected from the first fuel injection valve 12, and at the same time, CNG is injected from the second fuel injection valve 13, so that the air fuel ratio of the exhaust gas discharged from the internal combustion engine is caused to change to the rich side and to the lean side. Here, the concentration of the oxygenated fuel in the liquid fuel is detected by the oxygenated fuel concentration sensor 15, and as shown in FIG. 6, the higher the concentration of the oxygenated fuel, the more the proportion of the liquid fuel to be supplied is decreased. In other words, the higher the concentration of the oxygenated fuel, the more the amount of liquid fuel injection is decreased. In addition, as shown in FIG. 7, the exhaust gas purification catalyst 19 has an oxygen adsorption capacity which is higher in accordance with the higher temperature of the exhaust gas purification catalyst 19. The oxygen adsorption capacity of the exhaust gas purification catalyst 19 is the highest when new, and falls as it is used. Accordingly, the temperature of the exhaust gas purification catalyst 19 is detected by the catalyst temperature sensor 20, and as shown in FIG. 8, the higher the temperature of the exhaust gas purification catalyst 19, the more the proportion of the liquid fuel to be supplied is decreased. In other words, the higher the temperature of the exhaust gas purification catalyst 19, the more the amount of liquid fuel injection is decreased. In step S105 of this embodiment, the liquid fuel is injected from the first fuel injection valve 12 and at the same time CNG is injected from the second fuel injection valve 13, but only the liquid fuel may be injected from the first fuel injection valve 12. Then, the changes both at the rich side and at the lean side of the air fuel ratio of the exhaust gas are detected by the air fuel ratio sensor 18. Also, the oxygen concentration downstream of the exhaust gas purification catalyst 19 at the time when the air fuel ratio of the exhaust gas has been caused to change to the rich side and to the lean side is detected by the $O_2$ sensor 21. As a result of this, if the output of the $O_2$ sensor 21 indicates that the oxygen concentration downstream of the exhaust gas purification catalyst 19 rises in accordance with the air fuel ratio of the exhaust gas having been caused to change to the rich side, and that the oxygen concentration downstream of the exhaust gas purification catalyst 19 falls in accordance with the air fuel ratio of the exhaust gas having been caused to change to the lean side, it is determined that the exhaust gas purification catalyst 19 has not deteriorated. On the other hand, if the output of the $O_2$ sensor 21 indicates that the oxygen concentration downstream of the exhaust gas purification catalyst 19 changes not in accordance with the air fuel ratio of the exhaust gas having been caused to change to the rich side and to the lean side, it is determined that the exhaust gas purification catalyst 19 has deteriorated. After the processing of S105, this routine is once ended.

According to this routine as described above, it is possible to accurately detect the deterioration of the exhaust gas purification catalyst 19 which is applied to the internal combustion engine 1 capable of using CNG and liquid fuel, even when only the CNG is used for fuel. In addition, the supply of the liquid fuel can be made to a necessity minimum, whereby the deterioration of exhaust emission due to the supply of the liquid fuel can be suppressed.

Other Examples

Here, note that the device structure or arrangement to which the present invention can be applied is not limited to that shown in FIG. 1. For example, a NOx purification catalyst may be arranged in the exhaust pipe 11 downstream of the $O_2$ sensor 21. With the arrangement of the NOx purification catalyst, even if the exhaust gas air fuel ratio is made lean by means of the catalyst deterioration determination control, NOx can be prevented from flowing downstream, thus making it possible to suppress the deterioration of exhaust emission.

Although in this embodiment, the first fuel injection valve 12 is arranged in the intake port 5, the first fuel injection valve 12 may also instead be arranged in the cylinder 2 of the internal combustion engine 1 and controlled in such a manner that the time when the liquid fuel is to be injected from the first fuel injection valve is the time of the exhaust stroke in the catalyst deterioration determination control. In addition, an addition valve, which serves to add the liquid fuel in the catalyst deterioration determination control, may be arranged separately in the exhaust pipe 11. According to these, the liquid fuel, being supplied or not supplied to the cylinder 2 of the internal combustion engine 1 in the catalyst deterioration determination control, does not burn inside the cylinder 2, so that combustion deterioration can be avoided.

(Others)

The catalyst deterioration detection apparatus according to the present invention is not limited to the above-mentioned embodiment, but can be subjected to various changes and modifications within the scope not departing from the gist of the present invention. In addition, the above-mentioned embodiment is also an embodiment of a catalyst deterioration detection method according to the present invention.

DESCRIPTION OF THE REFERENCE SIGNS

1: internal combustion engine
2: cylinder
3: piston
4: combustion chamber
5: intake port
6: exhaust port
7: spark plug
8: intake valve
9: exhaust valve
10: intake pipe
11: exhaust pipe
12: first fuel injection valve
13: second fuel injection valve
14: first fuel tank
15: oxygenated fuel concentration sensor
16: second fuel tank
17: throttle valve
18: air fuel ratio sensor
19: exhaust gas purification catalyst
20: catalyst temperature sensor
21: $O_2$ sensor
22: ECU

The invention claimed is:

1. A catalyst deterioration detection apparatus comprising:
an exhaust gas purification catalyst that is arranged in an exhaust passage of an internal combustion engine operable on both gas fuel and liquid fuel;
an oxygen sensor that is arranged in said exhaust passage at a downstream side of said exhaust gas purification catalyst; and
an electronic control unit (ECU) configured to execute catalyst deterioration determination control in which an air fuel ratio of an exhaust gas discharged from said internal combustion engine is changed to a rich side and a lean side, a comparison is made between a change of the air fuel ratio and a change of an output of said oxygen sensor, and a determination is made whether said exhaust gas purification catalyst has deteriorated;
wherein the gas fuel is difficult to cause oxygen occluded in said exhaust gas purification catalyst to be released therefrom when the air fuel ratio of the exhaust gas discharged from said internal combustion engine is changed to the rich side in comparison to the liquid fuel, and
when executing the catalyst deterioration determination control while said internal combustion engine is operated by using only the gas fuel, said ECU selects either one of determining whether said exhaust gas purification catalyst has deteriorated based on a change in the output of said oxygen sensor only at the lean side and determining whether said exhaust gas purification catalyst has deteriorated based on changes in the output of said oxygen sensor at the rich side and at the lean side.

2. The catalyst deterioration detection apparatus as set forth in claim 1, wherein, in case where said ECU selects determining whether said exhaust gas purification catalyst has deteriorated based on the changes at the rich side and at the lean side in the output of said oxygen sensor, both the gas fuel and the liquid fuel are supplied or only the liquid fuel is supplied.

3. The catalyst deterioration detection apparatus as set forth in claim 2, wherein in cases where the liquid fuel to be supplied includes an oxygenated fuel, the higher a concentration of said oxygenated fuel, the more proportion of the liquid fuel to be supplied is decreased.

4. The catalyst deterioration detection apparatus as set forth in claim 2, wherein the higher a temperature of said exhaust gas purification catalyst, the more a proportion of the liquid fuel to be supplied is decreased.

5. The catalyst deterioration detection apparatus as set forth in claim 1, wherein, in the catalyst deterioration determination control by said ECU, a center point is shifted to the lean side at the time when the air fuel ratio of the exhaust gas discharged from said internal combustion engine is caused to change to the rich side and to the lean side.

6. A catalyst deterioration detection method for an exhaust gas purification catalyst that is arranged in an exhaust passage of an internal combustion engine operable on both gas fuel and liquid fuel comprising steps of;
an oxygen concentration detection step of detecting the oxygen concentration in said exhaust passage at a downstream side of said exhaust gas purification catalyst; and
a catalyst deterioration determination step of causing an air fuel ratio of an exhaust gas discharged from said internal combustion engine to change to a rich side and a lean side, making a comparison between a change of the air fuel ratio and a change of oxygen concentration detected by said oxygen concentration detection step, and determining whether said exhaust gas purification catalyst has deteriorated;
wherein the gas fuel is difficult to cause oxygen occluded in said exhaust gas purification catalyst to be released therefrom when the air fuel ratio of the exhaust gas discharged from said internal combustion engine is changed to the rich side in comparison to the liquid fuel, and when said catalyst deterioration determination step determines whether said exhaust gas purification catalyst has deteriorated while said internal combustion engine is operated by using only the gas fuel, said catalyst deterioration determination step further includes selecting either one determining whether said exhaust gas purification catalyst has deteriorated based on a change in the oxygen concentration detected by said oxygen concentration detection step only at the lean side and determining whether said exhaust gas purification catalyst has deteriorated based on changes in the oxygen concentration detected by said oxygen concentration detection step at the rich side and at the lean side.

* * * * *